US008175621B2

(12) United States Patent
Hsu

(10) Patent No.: US 8,175,621 B2
(45) Date of Patent: May 8, 2012

(54) METHODS FOR PROVIDING MULTIPLE WIRELESS COMMUNICATION SERVICES WITH REDUCED PAGING COLLISIONS AND COMMUNICATION APPARATUSES UTILIZING THE SAME

(75) Inventor: Chia-Chen Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 925 days.

(21) Appl. No.: 12/197,428

(22) Filed: Aug. 25, 2008

(65) Prior Publication Data
US 2009/0215472 A1    Aug. 27, 2009

Related U.S. Application Data

(60) Provisional application No. 61/031,769, filed on Feb. 27, 2008.

(51) Int. Cl.
*H04W 68/00* (2009.01)
(52) U.S. Cl. .............. 455/458; 455/552.1; 455/466; 455/515; 370/316; 370/327; 370/330
(58) Field of Classification Search ............. 455/552.1, 455/515, 458, 558; 370/316, 327, 328, 330, 370/229
See application file for complete search history.

(56) References Cited

U.S. PATENT DOCUMENTS

| 5,884,188 | A | 3/1999 | Hayes | |
|---|---|---|---|---|
| 6,282,178 | B1 * | 8/2001 | Noerpel et al. | 370/316 |
| 6,307,846 | B1 * | 10/2001 | Willey | 370/329 |
| 6,556,820 | B1 | 4/2003 | Le et al. | |
| 6,560,439 | B1 * | 5/2003 | Grayson | 455/12.1 |
| 6,826,400 | B1 * | 11/2004 | Cashman et al. | 455/434 |
| 6,999,799 | B1 | 2/2006 | Almassy | |
| 7,092,716 | B2 | 8/2006 | Nizri et al. | |
| 7,197,323 | B2 | 3/2007 | Terry | |
| 7,440,763 | B2 | 10/2008 | Lundsjo et al. | |
| 2003/0016174 | A1 | 1/2003 | Anderson | |
| 2003/0125073 | A1 | 7/2003 | Tsai et al. | |
| 2005/0124358 | A1 | 6/2005 | Willey | |
| 2005/0148348 | A1 | 7/2005 | Cramby et al. | |
| 2005/0186973 | A1 * | 8/2005 | Gaal et al. | 455/458 |
| 2009/0176513 | A1 | 7/2009 | Bosch et al. | |

FOREIGN PATENT DOCUMENTS
CN        1236532        11/1999

OTHER PUBLICATIONS

English language translation of abstract of CN 1236532 (published Nov. 24, 1999).

* cited by examiner

*Primary Examiner* — Kamran Afshar
*Assistant Examiner* — Kathy Wang-Hurst
(74) *Attorney, Agent, or Firm* — Thomas|Kayden

(57) ABSTRACT

A communication apparatus is provided. The communication apparatus comprises a radio transceiver module, a first subscriber identity card, a second subscriber identity card and a processor. The processor is coupled to the radio transceiver module, the first subscriber identity card and the second subscriber identity card, determines a first paging parameter for the first subscriber identity card, obtains second paging parameters from a second cell belonging to a second wireless network for the second subscriber identity card, determines one from the obtained second paging parameters with consideration of the determined first paging parameter, and transmits the determined second paging parameter via the radio transceiver module to the second wireless network through the second cell, thereby enabling the second cell to broadcast paging messages periodically by a time period based on the determined second paging parameter.

17 Claims, 7 Drawing Sheets

METHODS FOR PROVIDING MULTIPLE WIRELESS COMMUNICATION SERVICES WITH REDUCED PAGING COLLISIONS AND COMMUNICATION APPARATUSES UTILIZING THE SAME

CROSS REFERENCE TO RELATED APPLICATIONS

This application claims the benefit of U.S. Provisional Application No. 61/031,769, filed Feb. 27, 2008.

BACKGROUND OF THE INVENTION

1. Field of the Invention

The invention relates to a wireless communication apparatus, and more particularly to a wireless communication apparatus capable of providing multiple wireless communication services with reduced paging collisions.

2. Description of the Related Art

The term wireless is now normally used to refer to any type of electrical or electronic operation which is accomplished without the use of a "hard wired" connection. Wireless communication is the transfer of information over a distance without the use of electrical conductors or "wires". The distances involved may be short (a few meters for television remote controls) or very long (thousands or even millions of kilometers for radio communications). The best known example of wireless technology is the cellular telephone. Cellular telephones use radio waves to enable an operator to make phone calls from many locations world-wide. They can be used anywhere, as long as there is a cellular telephone site to house equipment that is required to transmit and receive signals that are used to transfer both voice and data to and from the cellular telephones.

There are various kinds of cellular communication technologies that have been well developed and defined. For example, the Global System for Mobile communications (GSM) is a well defined and commonly adopted communication system which uses the time division multiple access (TDMA) technology, a multiplex access scheme for digital radio, to send voice, data, and signaling data (such as a dialed telephone number) between mobile phones and cell sites. CDMA2000 is a hybrid 2.5G/3G (generation) technology of mobile telecommunications standards that use code division multiple access (CDMA). The UMTS (Universal Mobile Telecommunications System) is a 3G mobile communications system which provides an enhanced range of multimedia services over the 2G GSM system.

With the development of cellular communication technologies, it is now possible to provide multiple wireless communication services using different or the same communication technologies in one mobile station (MS). In order to provide reliable services without paging data lost, a method for coordinating the wireless communication services in one user equipment with reduced paging collision is needed.

BRIEF SUMMARY OF THE INVENTION

Communication apparatuses and methods for providing multiple wireless communication services in a communication apparatus with reduced paging collisions are provided. An exemplary embodiment of such a communication apparatus comprises a radio transceiver module, a first subscriber identity card communicating with a first wireless network via the radio transceiver module through a first cell belonging to the first wireless network, a second subscriber identity card communicating with a second wireless network via the radio transceiver module through a second cell belonging to the second wireless network, and a processor. The processor is coupled to the radio transceiver module, the first subscriber identity card and the second subscriber identity card, determines a first paging parameter for the first subscriber identity card, obtains second paging parameters from a second cell belonging to a second wireless network for the second subscriber identity card, determines one from the obtained second paging parameters with consideration of the determined first paging parameter, and transmits the determined second paging parameter via the radio transceiver module to the second wireless network through the second cell, thereby enabling the second cell to broadcast paging messages periodically by a time period based on the determined second paging parameter.

An exemplary embodiment of a method for providing multiple wireless communication services in a communication apparatus with reduced paging collisions will be illustrated. The communication apparatus comprises a radio transceiver module, a first subscriber identity card communicating with a first wireless network via the radio transceiver module, a second subscriber identity card communicating with a second wireless network via the radio transceiver module, and a processor coupled to the radio transceiver module, the first subscriber identity card and the second subscriber identity card. The method comprising using the processor comprises: obtaining a first paging parameter from a first cell belonging to the first wireless network via the radio transceiver module; obtaining a plurality of second paging parameters from a second cell belonging to the second wireless network via the radio transceiver module; obtaining a plurality of corresponding paging collision numbers each according to the first paging parameter and each second paging parameter; determining one from the second paging parameters with the minimum paging collision number; and transmitting the determined second paging parameter via the radio transceiver module to the second wireless network through the second cell belonging to the second wireless network, thereby enabling the second cell to broadcast a plurality of second paging messages periodically by a time period based on the determined second paging parameter.

Another exemplary embodiment of a method for providing multiple wireless communication services in a communication apparatus with reduced paging collisions will be illustrated. The communication apparatus comprises a radio transceiver module, a first subscriber identity card communicating with a first wireless network via the radio transceiver module, a second subscriber identity card communicating with a second wireless network via the radio transceiver module, and a processor coupled to the radio transceiver module, the first subscriber identity card and the second subscriber identity card. The method comprising using the processor comprises: obtaining a plurality of first paging parameters from a first cell belonging to the first wireless network via the radio transceiver module; obtaining a plurality of second paging parameters from a second cell belonging to the second wireless network via the radio transceiver module; obtaining a plurality of first paging occasions distributed within a predetermined time interval for each first paging parameter; obtaining a plurality of second paging occasions distributed within the predetermined time interval for each second paging parameter; and determining one from the first paging parameters and one from the second selected paging parameters according to the obtained first paging occasions and the obtained second paging occasions, thereby enabling the first cell to broadcast a plurality of first paging messages periodically by a first time period based on the determined first paging parameter, and the second cell to broadcast a plurality of second paging messages periodically by a second time period based on the determined second paging parameter A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
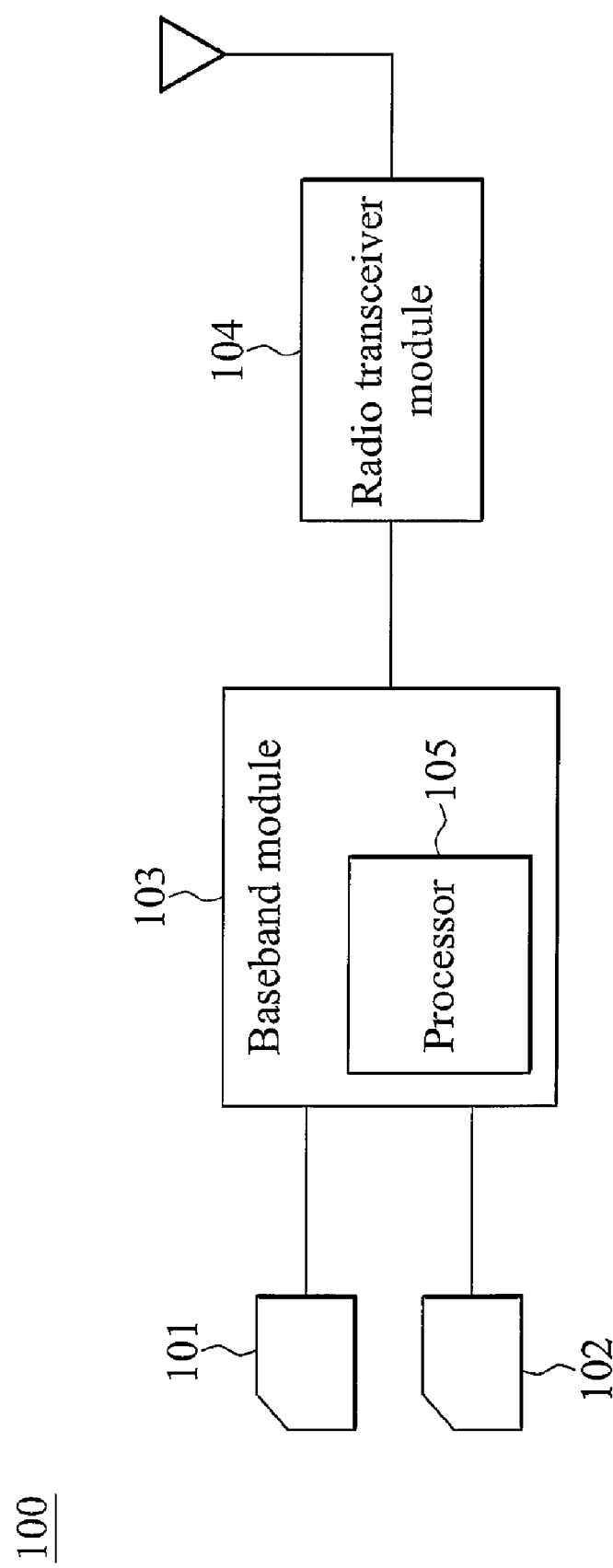
FIG. 1 shows a communication apparatus capable of providing multiple wireless communication services with reduced paging collisions according to an embodiment of the invention.
Figure 2:
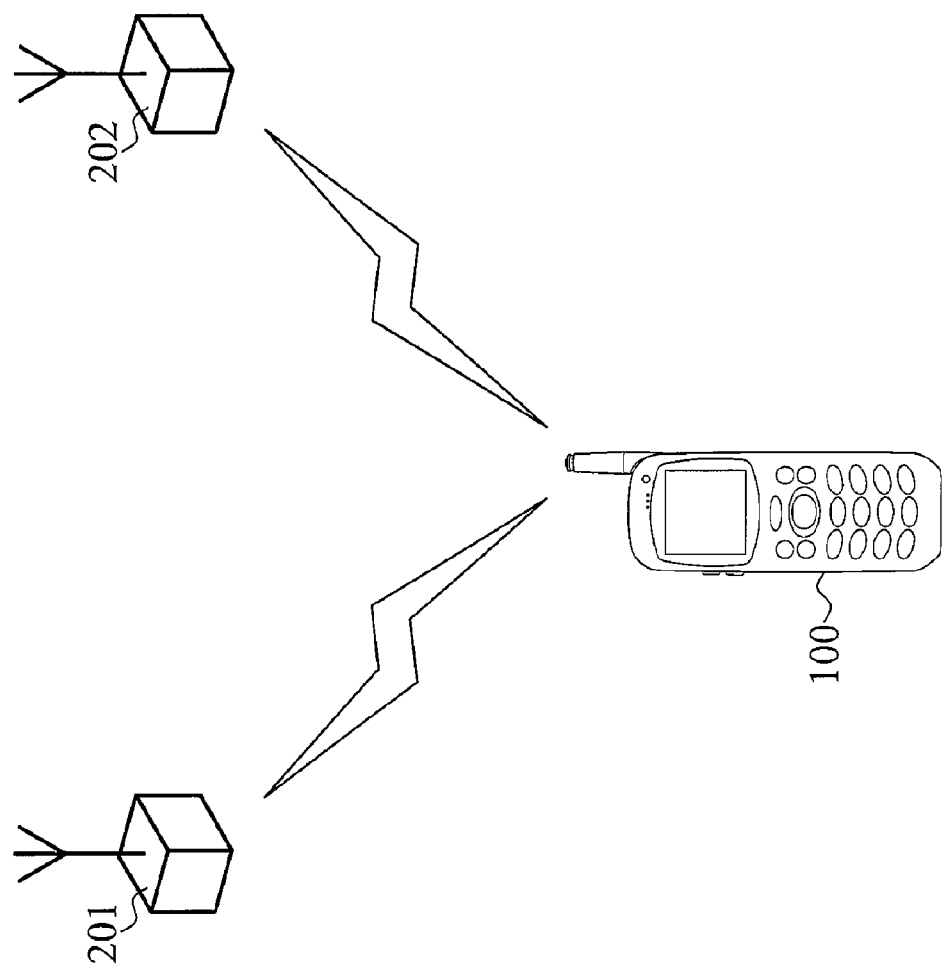
FIG. 2 shows an exemplary network topology according to an embodiment of the invention.

FIG. 1 shows a communication apparatus capable of providing multiple wireless communication services with reduced paging collisions according to an embodiment of the invention. As shown in FIG. 1, communication apparatus 100 comprises two subscriber identity cards 101 and 102, a baseband module 103, and a radio transceiver module 104, wherein the baseband module 103 is coupled to the subscriber identity cards 101 and 102, and the radio transceiver module 104. The radio transceiver module 104 receives radio frequency wireless signals, converts the received signals to baseband signals to be processed by the baseband module 103, or receives baseband signals from the baseband module 103 and converts the received signals to radio frequency wireless signals to be transmitted to a peer device. The radio transceiver module 104 may comprise a plurality of hardware devices to perform radio frequency conversion. For example, the radio transceiver module 104 may comprises a mixer to multiply the baseband signals with a carrier oscillated in the radio frequency of the wireless communication system, wherein the radio frequency may be, for example, 900 MHz or 1800 MHz in a global system for mobile communication (GSM). The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjusting, modulation/demodulation, encoding/decoding, and so on. The baseband module 103 further comprises a processor 105 for controlling the operations of the subscriber identity cards 101 and 102 plugged in two sockets respectively, and the radio transceiver module 104. The processor 105 reads data from the plugged subscriber identity cards 101 and 102 and writes data to the plugged subscriber identity cards 101 and 102. FIG. 2 shows an exemplary network topology according to an embodiment of the invention. According to the embodiment of the invention, two subscriber identity cards 101 and 102 share the baseband module 103 and the radio transceiver module 104 of the communication apparatus 100. Thus, the subscriber identity card 101 camps on a base station 201 and communicates with the first base station 201 via the radio transceiver module 104, and registers in a wireless network via the base station 201. Similarly, the subscriber identity card 102 camps on a base station 202 and communicates with the second base station 202 via the radio transceiver module 104, and registers in a wireless network via the base station 202.

According to an embodiment of the invention, the subscriber identity card 101 or 102 may relate to one kind of wireless communication system. For example, the subscriber identity card 101 or 102 may be a subscriber identity module (SIM) card of the GSM, or the universal subscriber identity module (USIM) card of the Universal Mobile Telecommunications System (UMTS), or the removable user identity module (RUIM) card or the CDMA Subscriber Identity Module (CSIM) card of the CDMA2000 system, or others. An SIM card typically contains user account information, an international mobile subscriber identity (IMSI) and a set of SIM application toolkit (SAT) commands and provides storage space for phone book contacts. The processor 105 of the Baseband module 103 may interact with an MCU of the SIM card to fetch data or SAT commands from the plugged SIM card. The communication apparatus 100 is immediately programmed after plugging in the SIM card. The SIM card may be also programmed to display custom menus for personalized services. The communication apparatus 100 may be plugged in an USIM card for UMTS (also called 3G) telephony communication. The USIM card stores user account information, IMSI, authentication information and a set of USIM Application Toolkit (USAT) commands and provides storage space for text messages and phone book contacts. The Baseband processor 105 may interact with a MCU of the USIM card to fetch data or SAT commands from the plugged USIM card. The phone book on the USIM card has been greatly enhanced than that on the SIM card. For authentication purposes, the USIM card may store a long-term pre-shared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in UMTS. The communication apparatus 100 is immediately programmed after plugging in the USIM card. The IMSI is a unique number associated with a global system for mobile communication (GSM) or a universal mobile telecommunications system (UMTS) network user. The IMSI may be sent by the ME to a GSM or UMTS network to acquire other details of the mobile user in the Home Location Register (HLR) or as locally copied in the Visitor Location Register (VLR). An IMSI is typically 15 digits long, but can be shorter. The first 3 digits are the Mobile Country Code (MCC), and are followed by the Mobile Network Code (MNC), either 2 digits (European standard) or 3 digits (North American standard). The remaining digits are the mobile subscriber identification number (MSIN) for a GSM or UMTS network user.

Taking the communication apparatus 100 equipped with one or more SIM cards (shown in FIG. 1) as an example, the communication apparatus 100 can be operated in idle mode and dedicated mode for each inserted SIM card. In idle mode, the communication apparatus 100 is either powered off, or searches for or measures the Broadcast Control Channel (BCCH) with better signal quality from a base station provided by a specific network operator, or is synchronized to the BCCH of a specific base station and ready to perform a random access procedure on the Random Access Channel (RACH) for requesting a dedicated channel. In dedicated mode, the communication apparatus 100 occupies a physical channel and tries to synchronize therewith, and establishes logical channels and switch them through.

Specifically, for each inserted SIM card in idle mode, the communication apparatus 100 continuously listens to the BCCH from a base station and reads the BCCH information and conducts periodic measurements of the signaling strength of the BCCH carriers in order to select a cell to be camped on. In idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information is broadcast by a base station system on the BCCH, SYSTEM INFORMATION, SI, Types 1-4) and therefore is available to all MSs currently in the cell. The SI comprises a Public-Land-Mobile-Network (PLMN) code uniquely owned by a network operator. The PLMN code comprising a Mobile Country Code (MCC) and a Mobile Network Code (MNC), indicating which network operator provides communication services. In addition, a cell identity (ID) indicating which cell broadcasts the BCCH is also contained in the SI. The PLMN code may be acquired and stored in a corresponding SIM card of the electronic device upon receiving the SI from the BCCH. The BSS further continuously sends on all PCHs of a cell valid Layer 3 messages (PAGING REQUEST) which the communication apparatus 100 can decode and recognize if its address (e.g. its IMSI of a specific SIM card) is paged. The communication apparatus 100 periodically monitors the PCH to avoid paging call loss, where the monitoring moments referred to as paging occasions.

Taking the communication apparatus 100 equipped with one or more USIM cards (shown in FIG. 1) as an example, the communication apparatus 100 can be operated in idle mode and connected mode for each inserted USIM card. For each USIM card in idle mode, the communication apparatus 100 selects (either automatically or manually) a public land mobile network (PLMN) to contact. The communication apparatus 100 continuously listens to Broadcast Control Channel (BCCH) to acquire SYSTEM INFORMATION (SI) comprising a Public-Land-Mobile-Network (PLMN) code uniquely owned by a network operator. The PLMN code comprising a Mobile Country Code (MCC) and a Mobile Network Code (MNC), indicating which network operator provides communication services. In addition, a cell identity (ID) indicating which cell broadcasts the BCCH is also contained in the SI. The PLMN code may be acquired and stored in a corresponding USIM card of the electronic device upon receiving the SI from the BCCH. The communication apparatus 100 searches for a suitable cell of the chosen PLMN chooses that cell to provide available services, and tunes to its control channel, also referred to as "camping on a cell". After camping on a cell in idle mode, the MS can receive system information and cell broadcast messages from a node-B. The communication apparatus 100 stays in idle mode until the communication apparatus 100 transmits a request to establish a Radio Resource Control (RRC) connection. In idle mode, the communication apparatus 100 is identified by non-access stratum identities such as IMSI, TMSI and P-TMSI.

In the Cell_DCH state of connected mode, a dedicated physical channel is allocated to the communication apparatus 100, and the communication apparatus 100 is known by its serving radio network controller (SRNC) on a cell or active set level. The communication apparatus 100 performs measurements and sends measurement reports according to measurement control information received from radio network controller (RNC). The communication apparatus 100 with certain capabilities monitors the Forward Access Channel (FACH) for system information messages. In the Cell_FACH state of connected mode, no dedicated physical channel is allocated for the communication apparatus 100, but Random Access Channel (RACH) and FACH are used instead, for transmitting both signaling messages and small amounts of user plane data. In this state, the communication apparatus 100 also listens to the Broadcast Channel (BCH) to acquire system information. The communication apparatus 100 performs cell reselections, and after a reselection typically sends a Cell Update message to the RNC, so that the RNC knows the MS location on a cell level. In the Cell_PCH state of connected mode, the communication apparatus 100 is known on a cell level in Serving Radio Network Controller (SRNC), but the MS can be reached only via the Paging Channel (PCH). The communication apparatus 100 periodically monitors the PCH to avoid paging call loss, where the monitoring moments referred to as paging occasions.

Figure 3:
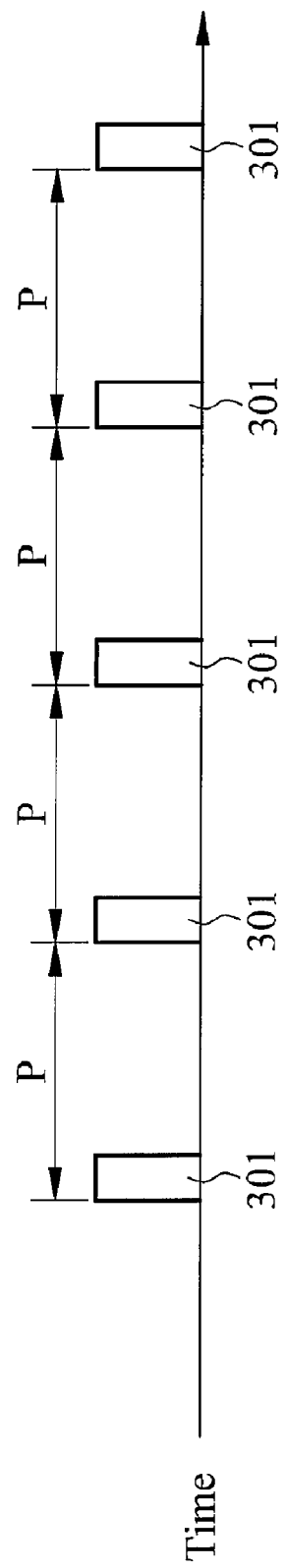
FIG. 3 shows an exemplary distribution of paging occasions along the time axis.

In the communication systems such as the GSM, the UMTS, the General Packet Radio Service (GPRS) or the Time Division-Synchronous Code Division Multiple Access (TD-SCDMA) communication system, the communication apparatus, also known as the mobile station (MS) or the user equipment (UE), may use discontinuous reception (DRX) in the idle mode to reduce power consumption. When DRX is used, the base station (e.g. 201 or 202 of FIG. 2) may transmit the paging messages periodically at the paging occasions and thus, the communication apparatus 100 requires to receive the paging messages carried in the paging channel (PCH) burst at the paging occasions. The paging occasion defines the time for the communication apparatus 100 to wake up and receive the PCH burst. FIG. 3 shows an exemplary distribution of paging occasions 301 and the corresponding paging periods P along the time axis. As FIG. 3 shows, during the DRX cycle, each MS performing power saving may wake up at its own paging occasions 301 to check up on paging messages. After receiving the paging message, the communication apparatus 100 decides whether to sleep again by checking the Page Indicator (PI) in the paging message. If the paging indicator reveals that the communication apparatus 100 is now being paged, the communication apparatus 100 may initiate a process for receiving an incoming call. Otherwise, the communication apparatus 100 decides to sleep again and will wake up at its next paging occasion.

The DRX cycle length may be negotiated between the communication apparatus 100 and the node-B (operating as a role similar with that of the base station in GSM). Take the UMTS system for example, after receiving the DRX cycle length coefficient k from the system information carried in a Broadcast Control Channel (BCCH) burst, the DRX cycle length is determined by $$MAX(2^k, PBP) \text{ frames,} \qquad \text{Eq. 1}$$

where k is an integer and PBP is the paging block periodicity.

According to the specifications defined by the 3rd Generation Partnership Project (3GPP), the communication apparatus 100 may be attached to different core network (CN) domains with different CN domain specific DRX cycle lengths. The communication apparatus 100 may store each CN domain specific DRX cycle length for each CN domain and the communication apparatus 100 is attached to and use the shortest of those DRX cycle lengths. The PS CN specific DRX cycle length coefficient may be updated after the negotiation between the communication apparatus 100 and PS CN by a Non-Access Stratum (NAS) procedure. If no specific value "k" is negotiated in the NAS procedure, the communication apparatus 100 and PS CN may use the DRX cycle length given for the PS CN domain in the system information. The DRX cycle lengths to be used for the UMTS terrestrial radio access network (UTRAN) connected mode is the shortest of the UTRAN DRX cycle length or any of the stored CN domain specific DRX cycle lengths for the CN domains that the communication apparatus 100 is attached to without established signaling connection.

After determining the DRX cycle length, the value of the paging occasion 301 may be determined as follows:

$$\text{Paging Occasion} = \{(IMSI \text{ div } K) \text{mod}(DRX \text{ cycle length div } PBP)\} \times PBP +$$

$$n \times DRX \text{ cycle length} + \text{Frame Offset,} \qquad \text{Eq. 2}$$

where IMSI is the international mobile subscriber identity recorded in the SIM cards, n=0, 1, 2 and so on, as long as system frame number (SFN) is below its maximum value, and Frame Offset is the paging indicator channel (PICH) frame offset value. In addition, K represents the number of available secondary common control physical channels (SCCPCH) which carry a PCH, n denotes the system frame number, div is an operator returning integer quotient after division, and mod means modulo operator.

In the CDMA2000, the communication apparatus 100 performs certain tasks in the idle mode after registration is done, and constantly turns parts of the hardware devices (e.g. part of 104 of FIG. 2) on and off. The hardware devices are turned on to perform some vital functions and turned off again to save power so that the battery may last longer. This periodic turning on and off of the mobile transceiver is similar to the DRX operation in the GSM, UMTS, GPRS, or TD-SCDMA system, and is called a slotted mode operation in the CDMA2000. The communication apparatus 100 can operate in the slotted mode only in the idle mode. While the communication apparatus 100 is associated with a particular wireless network, for most of the time, it operates in the idle mode. When the communication apparatus 100 operates in the idle mode, it monitors the paging channel (PCH). If there is a procedure that is required to be carried out after a paging message is received on the PCH, the mobile enters the system access mode. Paging messages of the PCH and user's actions may both cause the communication apparatus 100 to change from the idle mode to the system access mode. Thus, in the idle mode, the communication apparatus 100 may receive messages, receive an incoming call (mobile station terminated call), initiate a call (mobile station originated call), initiate a registration, initiate a message transmission, or others.

The communication apparatus 100 wakes up periodically and turns on a receiver thereof to check whether the communication apparatus 100 has been paged, which means that it finds out if there is any incoming calls (mobile termination call, MT call) or any incoming messages. In the CDMA 2000, the time to wake up happens in a slot cycle, and the base station controls the period of the slot cycle.

When the communication apparatus 100 first registers at a base station (e.g. 201 or 202 of FIG. 2), the base station and communication apparatus 100 determine which PCH the mobile will use (if there is more than one) and what phase of the slot cycle the mobile will use. Thereafter, the communication apparatus 100 wakes up periodically, turns a receiver thereof on to check if there is an incoming call or if there is any traffic from the cell that the communication apparatus 100 must respond to. If there is nothing, the communication apparatus 100 shuts down the receiver again and waits until the next slot time.

The slot cycle index "SLOT_CYCLE_INDEX" specifies the amount of time between successive PCH slots to be monitored by the communication apparatus 100 in the idle state, which may also be referred to as paging occasions, which are shown in 301 of FIG. 3 with a similar concept. The amount of time between the slots is equal to $1.28 \times 2^i$ seconds, where the parameter i represents the slot cycle index "SLOT_CYCLEINDEX". The MS may specify a preferred slot cycle index, and during registration, inform the base station of the preferred slot cycle index. The base station then uses the informed preferred slot cycle index to determine the slot to use for paging the MS.

After registering to more than one wireless network such as the GSM, the GPRS, the UMTS, the CDMA2000, the TD-SCDMA and the similar, the MS obeys the requirements of slotted operation of different wireless networks and enters a sleep mode, such as the PS-domain DRX for the UMTS, the GPRS or the TD-SCDMA, or slotted mode for the CDMA2000. Since the paging period P is negotiable as previously discussed above, the MS may propose proper paging parameters such as a "k" value for the UMTS, "SLOT_CYCLE_INDEX" for the CDMA2000, or others, after receiving a plurality of possible paging parameters from the base station via the broadcasted system information to facilitate the wireless network to transmit the paging messages in desired paging occasions 301.

According to an embodiment of the invention, when the communication apparatus 100 equipped with more than two subscriber identity cards is going to register at and camp on cells belonging to the same or different wireless networks, the communication apparatus 100 may first determine an access sequence based on the network priorities, power consumption, or quality of service (QoS) requirement thereof.

A lookup table may be provided to describe a priority, power consumption, or QoS requirement of each wireless network. The stored network priorities may be defined by user commands, random values, or correspond to the provided services (for example, the priority for voice service is higher than that for data service). The power consumption corresponding to each wireless network may be obtained by periodic statistics or calculated by the measurement of environment parameters. The communication apparatus 100 may first consider wireless network priorities and then power consumption corresponding to wireless networks to determine the access sequence. For example, if two wireless networks have the same priority, a cell belonging to the wireless network with the lower power consumption is camped on first.

According to an embodiment of the invention, with the determined access sequence, the communication apparatus 100 may receive multiple broadcasted messages (referred to as first broadcasted messages hereinafter) from a cell belonging to a wireless network corresponding to the subscriber identity card 101 and receive multiple broadcasted messages (referred to as second broadcasted messages hereinafter) from a cell belonging to a wireless network corresponding to the subscriber identity card 102, where the cells may be covered by base stations or node-Bs (e.g. 201 and 202 shown in FIG. 2). Next, the processor 105 may obtain multiple paging parameters of the wireless network (referred to as first paging parameters hereinafter) from the first broadcasted messages and obtain multiple paging parameters of the wireless network (referred to as second paging parameters hereinafter) from the second broadcasted messages. The first and second paging parameters may be provided in the system information of the first and second broadcasted messages, such as the potential "k" values can be configured for the UMTS, the "SLOT_CYCLE_INDEX" values can be configured for the CDMA2000, or others. According to an embodiment of the invention, the processor 105 may first determine (i.e. select) one from the first paging parameters according to one or more predefined heuristic rules. For example, the processor 105 may randomly determine one from the first paging parameters, or may determine one from the paging parameters with the minimum power consumption, or may directly use the default parameter setting of the wireless network. After the first paging parameter is determined, the processor 105 may obtain multiple paging occasions (referred to as first paging occasions hereinafter) distributed within a predetermined time interval according to the determined first paging parameter, for example, by using the described Eq. 2, and, for each possible second paging parameter, may also obtain multiple paging occasions (referred to as second paging occasions hereinafter) distributed within the predetermined time interval. After that, for each corresponding arrangement of the paging occasions of the possible second paging parameter, the processor 105 may further compare the corresponding second paging occasions corresponding to each second paging parameter with the first paging occasions corresponding to the determined first paging parameter, and calculate collision probabilities therebetween. Thus, the processor 105 may obtain multiple paging collision values each representing the collision probabilities between the determined first paging parameter and one of all possible second paging parameters, wherein the paging collision value may be considered as the number of overlapped occurrences between the first paging occasions and the second paging occasions within the predetermined time interval, and obtain one from the second paging parameters with the minimum paging collision probability. Finally, the communication apparatus 100 may transmit the determined first paging parameter in an uplink message "ATTACH" or "ROUTING_AREA_UPDATE" via the radio transceiver module 104 to the wireless network corresponding to the subscriber identity card 101 when registration, and then camp on a cell belonging to the wireless network. Similarly, the communication apparatus 100 may transmit the determined second paging parameter in an uplink message "ATTACH" or "ROUTING_AREA_UPDATE" via the radio transceiver module 104 to the wireless network corresponding to the subscriber identity card 102 when registration, and then camp on a cell belonging to the wireless network. Thereby, the cell belonging to the wireless network may be enabled to broadcast multiple paging messages periodically by a first time period based on the determined first paging parameter for the subscriber identity card 101, and the cell belonging to the wireless network may be enabled to broadcast multiple paging messages periodically by a second time period based on the determined second paging parameter for the subscriber identity card 102. It should be noted that the steps of registering and camping on a cell belonging to the wireless network corresponding to the subscriber identity card 101 may be done after the first paging parameter is determined and before determination of second paging parameter.

Figure 4:
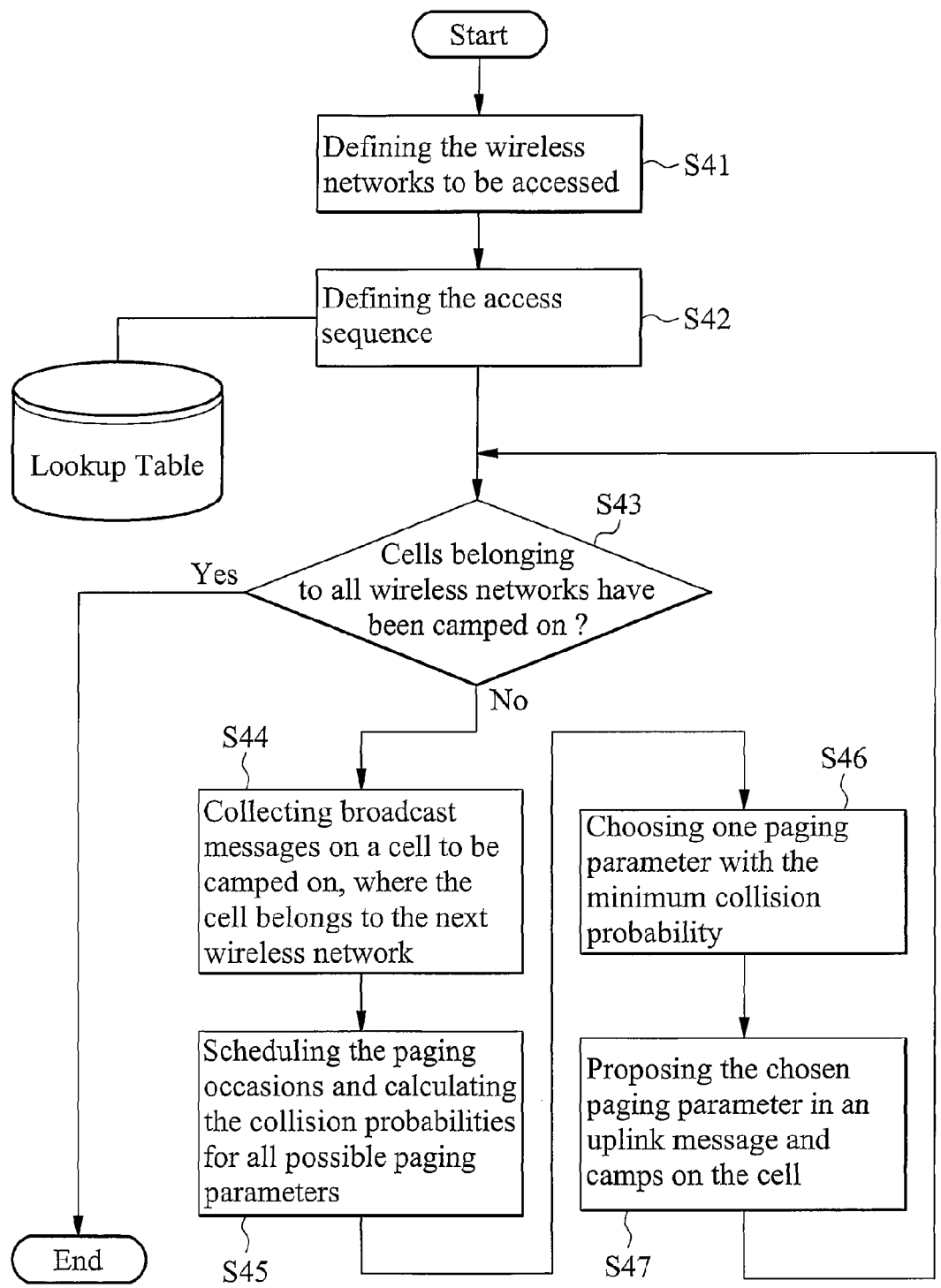
FIG. 4 shows a flow chart of the method for providing multiple wireless communication services in a communication apparatus with paging parameter negotiation based on the colliding extent of paging occasions according to an embodiment of the invention.

FIG. 4 shows a flow chart of the method for providing multiple wireless communication services in a communication apparatus with paging parameter negotiation based on the colliding extent of paging occasions according to an embodiment of the invention. First, the communication apparatus 100 begins by defining the wireless networks to be accessed for the inserted subscriber identity cards (Step S41). Next, the communication apparatus 100 defines the access sequence of the wireless networks (Step S42). The access sequence may be determined according to the criterion as described above. The determination of access sequence may further refer to the previously mentioned lookup table. Next, the communication apparatus 100 checks if cells belonging to all wireless networks have been camped on (Step S43). If not, a loop containing at least steps S43 to S47 is repeatedly performed until all corresponding cells are camped on. Otherwise, the process ends. In each loop for camping on a cell belonging to the next wireless network in the access sequence, the communication apparatus 100 collects broadcast messages on a cell to be camped on, where the cell belongs to the next wireless network (Step S44), schedules the paging occasions for all possible paging parameters presented in the collected broadcast messages and accordingly calculates collision probabilities of paging occasions (Step S45), chooses one paging parameter with the minimum collision probability (Step S46), and proposes the chosen paging parameter in an uplink message and camps on the cell (Step S47). The details of collision probability calculation and proposing of the chosen paging parameter in an uplink message may refer to the previous paragraphs.

Following, is a detailed description of an embodiment of a procedure for providing multiple wireless communication services in a communication apparatus with reduced paging collisions. In an embodiment of the invention below, it is assumed that a communication apparatus 100 plans to camp on a GSM network (first wireless network) for an inserted SIM card and a UMTS network (second wireless network) for an inserted USIM card, wherein the GSM network has a higher priority than the UMTS network. As the GSM paging parameter is determined, steps for determining one from possible UMTS paging parameters are provided below. The procedure comprises the following steps.

Figure 5:
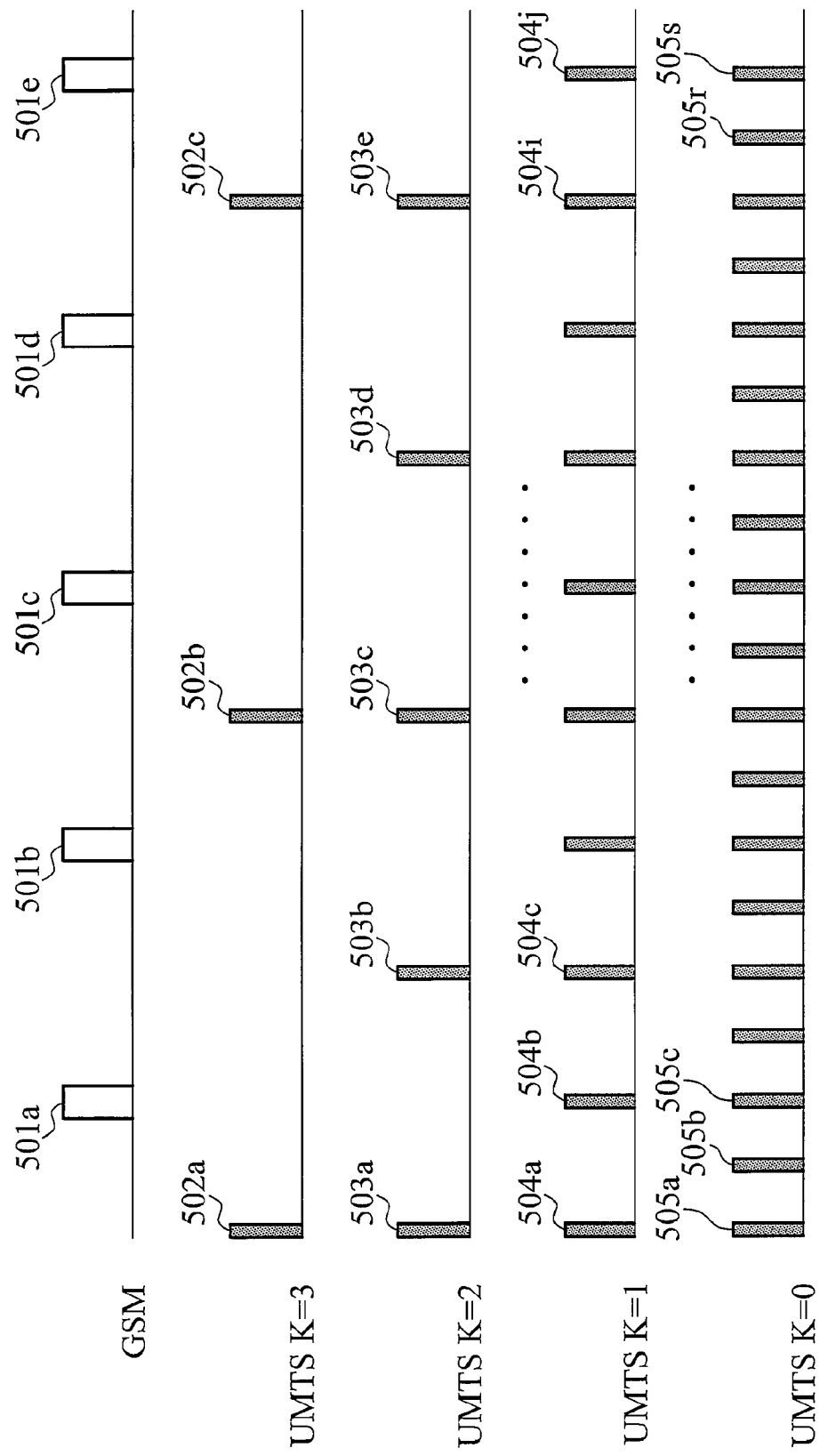
FIG. 5 shows an exemplary arrangements of the paging occasions according to paging parameters according to an embodiment of the invention.

1. The communication apparatus 100 camps on the GSM network with the determined GSM paging parameter, where the determined paging parameter will cause the communication apparatus 100 to listen to PCH based on the idle mode procedure at every paging occasions 501$a$ to 501$e$ with corresponding wake up periods as illustrated in the first row of FIG. 5, wherein the GSM paging parameter may be the default parameter setting in the GSM network or may be determined by network operator.

2. The communication apparatus 100 reads broadcast messages (particular system information blocks thereof) on a UMTS cell to obtain the DRX cycle length coefficient (k) proposed by the UTRAN, assuming k=3. According to the UMTS specification 3GPP 25.304, which describes that the DRX coefficient used between the communication apparatus 100 and the UTRAN is the minimal value of all CN domains, the possible UMTS paging parameters of k, for defining the DRX cycle length, not greater than 3 are 0, 1, 2 and 3.

3. The communication apparatus 100 obtains the schedules of UMTS paging occasions for all possible UMTS paging parameters of the DRX cycle length, such as k=3, 2, 1 and 0 as shown in the black blocks 502a to 502c, 503a to 503e, 504a to 504j and 505a to 505s in the second to fourth rows of FIG. 5 respectively.

4. The communication apparatus 100 calculates the collision probabilities of paging occasions between both the GSM and the UMTS networks according to the scheduled GSM paging occasions and UMTS paging occasions. It can be seen from FIG. 5 that, when k=3 or k=2, there is no collision present between the GSM and the UMTS networks.

5. The communication apparatus 100 provides either the paging parameter k=2 or k=3 in an uplink message "ATTACH" or "ROUTING_AREA_UPDATE" to the UMTS network as a proposed DRX cycle length during the registration procedure. The communication apparatus 100 may take another consideration into account to determine whether k=2 or k=3 is a proposed DRX cycle length, such as a power consumption or QoS corresponding to the candidate DRX cycle length settings.

6. The communication apparatus 100 camps on the UMTS networks and entering the idle mode.

According to an embodiment of the invention, after determining the first paging parameter and the second paging parameter and camping on cells belonging to the first wireless network and the second wireless network respectively, the processor 105 may direct the radio transceiver module 104 to listen to the PCH and receive a plurality of paging messages (referred to as first paging messages hereinafter) from the first wireless network at the first paging occasions corresponding to the determined first paging parameter and to listen to the PCH and receive a plurality of paging messages (referred to as second paging messages hereinafter) from the second wireless network at the corresponding second paging occasions corresponding to the determined second paging parameter.

Figure 6:
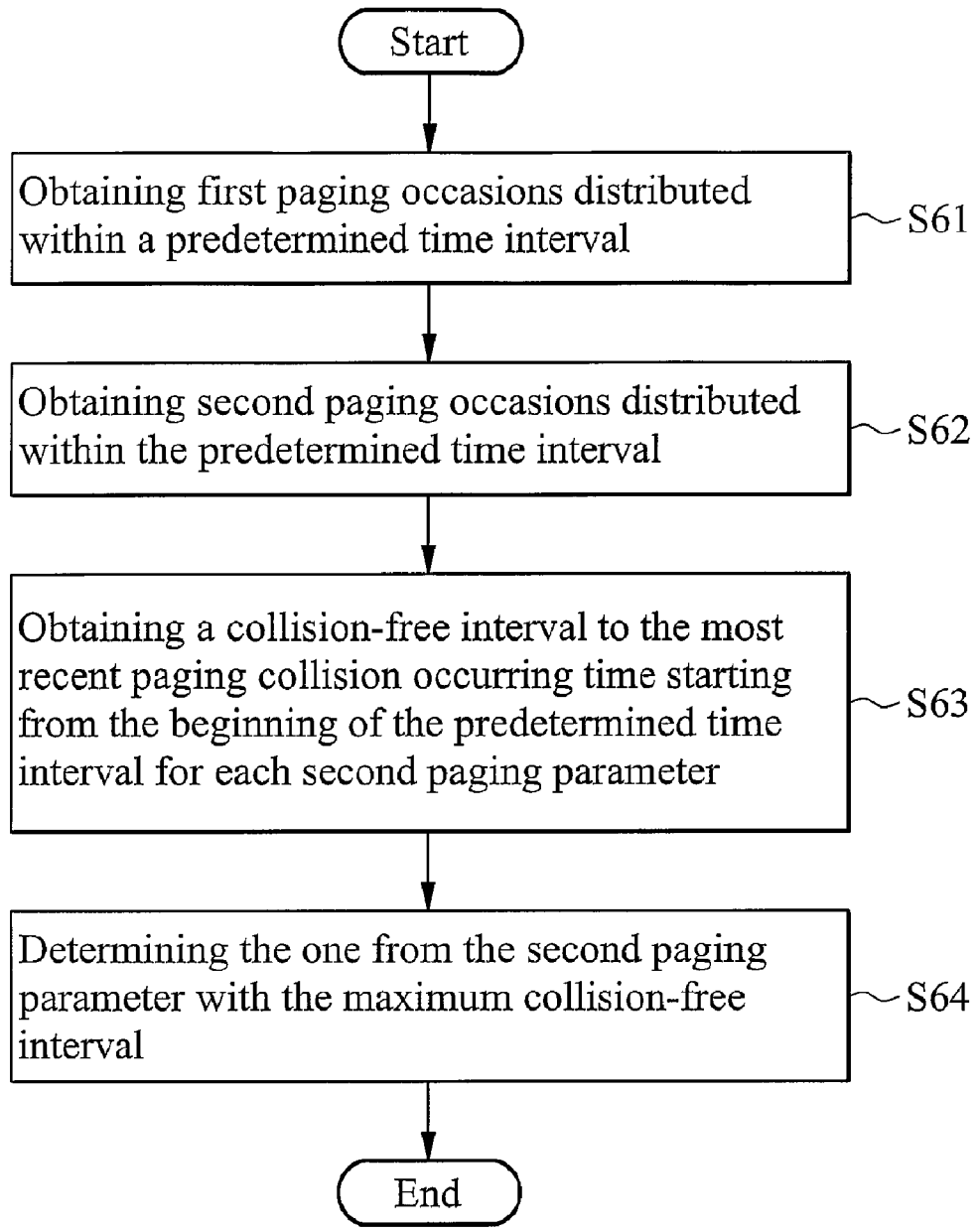
FIG. 6 shows a flow chart of a method for determining the minimum collision probability according to an embodiment of the invention.

It should be noted that there are various methods for determining the minimum collision probability and thus, the design may be quite flexible and the invention should not be limited to the methods as illustrated thereto. For example, the minimum collision probability may be determined by considering collision-free intervals to the most recent paging collision occurring time starting from the beginning of the predetermined time interval, instead of calculating the paging collision values within a predetermined time interval. FIG. 6 shows a flow chart of a method for determining the minimum collision probability according to an embodiment of the invention. First, the processor 105 obtains a plurality of first paging occasions distributed within a predetermined time interval according to the determined first paging parameter (Step S61), such as 501a to 501e shown in FIG. 5. Next, the processor 105 obtains a plurality of second paging occasions distributed within the predetermined time interval according to each second paging parameter (Step S62), such as 502a to 502c, 503a to 503e, 504a to 504j and 505a to 505s shown in FIG. 5. Next, the processor 105 obtains a collision-free interval to the most recent paging collision occurring time starting from the beginning of the predetermined time interval for each second paging parameter (Step S63), such as the entire predetermined time intervals for k=3 or k=2, from 504a to 504b for k=1, or 505a to 505c for k=0. Finally, the processor 105 determines the one from the second paging parameter with the maximum collision-free interval, i.e. the minimum collision probability (Step S64).

Figure 7:
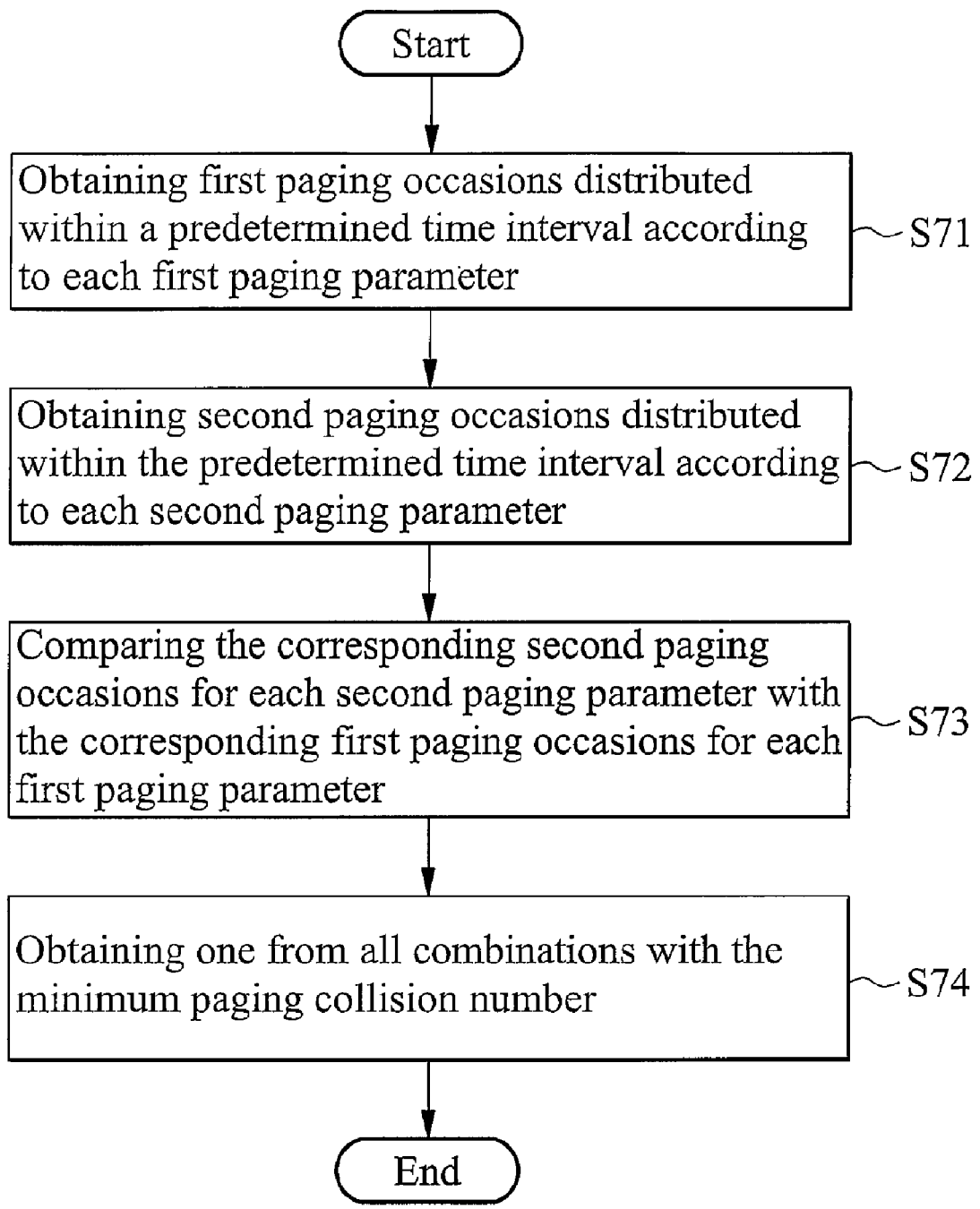
FIG. 7 shows a flow chart of a method for determining the minimum collision probability according to another embodiment of the invention.

For another example, the minimum collision probability may be determined by considering the paging collision extent between all possible first paging parameters and all possible second paging parameters and choosing a combination with the minimum collision possibility. For instance, when there are two possible first paging parameters and three possible second paging parameters, the processor may try (2×3=6) combinations of the possible first and second paging parameters, and choose a combination with the minimum collision possibility therebetween. FIG. 7 shows a flow chart of a method for determining the minimum collision probability according to another embodiment of the invention. First, the processor 105 obtains a plurality of first paging occasions distributed within a predetermined time interval according to each first paging parameter (Step S71), such as 501a to 501e shown in FIG. 5 and the similar. Next, the processor 105 obtains a plurality of second paging occasions distributed within the predetermined time interval according to each second paging parameter (Step S72), such as 502a to 502c, 503a to 503e, 504a to 504j and 505a to 505s shown in FIG. 5. Next, the processor 105 compares the corresponding second paging occasions for each second paging parameter with the corresponding first paging occasions for each first paging parameter to obtain a plurality of corresponding paging collision numbers each for a combination of one first paging parameter and one second paging parameter (Step S73). Finally, the processor 105 determines one from all combinations with the minimum paging collision number, wherein each paging collision number represents overlapped occurrences between the first paging occasions corresponding to one first paging parameter and the second paging occasions corresponding to one second paging parameter within the predetermined time interval.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus accompanying with a radio transceiver module, a first subscriber identity card communicating with a first wireless network via the radio transceiver module through a first cell belonging to the first wireless network and a second subscriber identity card communicating with a second wireless network via the radio transceiver module through a second cell belonging to the second wireless network, comprising:

a processor logic coupled to the radio transceiver module, the first subscriber identity card and the second subscriber identity card, determining a first paging parameter for the first subscriber identity card, processor logic obtaining a plurality of second paging parameters from the second cell belonging to the second wireless network for the second subscriber identity card, processor logic obtaining a plurality of corresponding paging collision numbers each according to the first paging parameter and each second paging parameter, processor logic determining one from the second paging parameters with the minimum paging collision number, processor logic determining one from the obtained second paging parameters with consideration of the determined first paging parameter, and processor logic transmitting the determined second paging parameter via the radio transceiver module to the second wireless network through the second cell belonging to the second wireless network, thereby enabling the second cell to broadcast a plurality of paging messages periodically by a time period based on the determined second paging parameter.

2. The communication apparatus as claimed in claim 1, further comprising processor logic that obtains a plurality of first paging occasions distributed within a predetermined time interval according to the determined first paging parameter, processor logic that obtains a plurality of second paging occasions distributed within the predetermined time interval for each second paging parameter, and processor logic that determines one from the second paging parameters according to the distributions between the first paging occasions and the second paging occasions.

3. The communication apparatus as claimed in claim 2, further comprising processor logic that compares the corresponding second paging occasions of each second paging parameter with the first paging occasions of the determined first paging parameter to obtain the paging collision extent between the second paging occasions of each second paging parameter and the first paging occasions, and processor logic that obtains one from the second paging parameters with the minimum paging collision extent, and wherein each paging collision extent represents an overlapped occurrence number between the first paging occasions and the second paging occasions of the corresponding second paging parameter within the predetermined time interval.

4. The communication apparatus as claimed in claim 1, wherein the second paging parameters are obtained from the system information carried in a Broadcast Control Channel (BCCH) burst from the second cell.

5. The communication apparatus as claimed in claim 1, wherein the second subscriber identity card is the universal subscriber identity module (USIM) card corresponding to the universal mobile telecommunications system (UMTS), or the removable user identity module (RUIM) card or the CDMA subscriber identity module (CSIM) card corresponding to the code division multiple access (CDMA) 2000 communication system.

6. The communication apparatus as claimed in claim 5, wherein the second paging parameters are the integer coefficients k for defining the discontinuous reception (DRX) cycle lengths in the UMTS, or the parameters SLOT_CYCLE_INDEX of the CDMA 2000 communication system.

7. The communication apparatus as claimed in claim 1, wherein the determined second paging parameter is transmitted via an attach message or a routing area update message to the second wireless network when the second subscriber identity card registers at the second wireless network.

8. The communication apparatus as claimed in claim 2, further comprising processor logic that directs the radio transceiver module to receive the paging messages from the second cell at the corresponding second paging occasions corresponding to the determined second paging parameter.

9. The communication apparatus as claimed in claim 1, further comprising processor logic that obtains a plurality of first paging occasions distributed within a predetermined time interval according to the determined first paging parameter, processor logic that obtains a plurality of second paging occasions distributed within the predetermined time interval for each second paging parameter, processor logic that obtains a collision-free interval to the most recent paging collision occurring time starting from the beginning of the predetermined time interval for each second paging parameter, and processor logic that determines one from the obtained second paging parameters with the maximum collision-free interval.

10. A method for providing multiple wireless communication services in a communication apparatus with reduced paging collisions, wherein the communication apparatus comprises a radio transceiver module, a first subscriber identity card communicating with a first wireless network via the radio transceiver module, a second subscriber identity card communicating with a second wireless network via the radio transceiver module, and a processor coupled to the radio transceiver module, the first subscriber identity card and the second subscriber identity card, and the method comprising using the processor comprises:
obtaining a first paging parameter from a first cell belonging to the first wireless network via the radio transceiver module;
obtaining a plurality of second paging parameters from a second cell belonging to the second wireless network via the radio transceiver module;
obtaining a plurality of corresponding paging collision numbers each according to the first paging parameter and each second paging parameter;
determining one from the second paging parameters with the minimum paging collision number; and
transmitting the determined second paging parameter via the radio transceiver module to the second wireless network through the second cell belonging to the second wireless network,
thereby enabling the second cell to broadcast a plurality of second paging messages periodically by a time period based on the determined second paging parameter.

11. The method as claimed in claim 10, wherein obtaining of the corresponding paging collision numbers and determination of second paging parameter further comprises:
obtaining a plurality of first paging occasions distributed within a predetermined time interval according to the first paging parameter;
obtaining a plurality of second paging occasions distributed within the predetermined time interval for each second paging parameter; and
determining one from the second paging parameters with a minimum paging collision number according to the distributions between the first paging occasions and the second paging occasions, wherein each paging collision number represents overlapped occurrences between the first paging occasions and the second paging occasions corresponding to one second paging parameter within the predetermined time interval.

12. The method as claimed in claim 11, wherein obtaining of the corresponding paging collision numbers further comprises:
comparing the corresponding second paging occasions of each second paging parameter with the first paging occasions of the first paging parameter to obtain the paging collision number for each second paging parameter.

13. The method as claimed in claim 10, wherein the second paging parameters are obtained from the system information carried in a Broadcast Control Channel (BCCH) burst from the second cell.

14. The method as claimed in claim 10, wherein the first subscriber identity card is the subscriber identity module (SIM) card corresponding to the global system for mobile communications (GSM), the universal subscriber identity module (USIM) card corresponding to the universal mobile telecommunications system (UMTS), or the removable user identity module (RUIM) card or the CDMA subscriber identity module (CSIM) card corresponding to the code division multiple access (CDMA) 2000 communication system, and wherein the second subscriber identity card is the universal subscriber identity module (USIM) card corresponding to the universal mobile telecommunications system (UMTS), or the removable user identity module (RUIM) card or the CDMA subscriber identity module (CSIM) card corresponding to the code division multiple access (CDMA) 2000 communication system.

15. The method as claimed in claim 14, wherein at least one of the first paging parameters and the second paging parameters are the integer coefficients k for defining the discontinuous reception (DRX) cycle lengths in the UMTS, or the parameters SLOT_CYCLE_INDEX of the CDMA 2000 communication system.

16. The method as claimed in claim 10, wherein the determined second paging parameter is transmitted via an attach message or a routing area update message to the second wireless network when the second subscriber identity card registers at the second wireless network.

17. The method as claimed in claim 10, further comprises:
receiving a plurality of first paging messages from the first cell via the radio transceiver module at the first paging occasions corresponding to the first paging parameter; and
receiving a plurality of second paging messages from the second cell via the radio transceiver module at the corresponding second paging occasions corresponding to the determined second paging parameter.

* * * * *